Patented Dec. 24, 1929

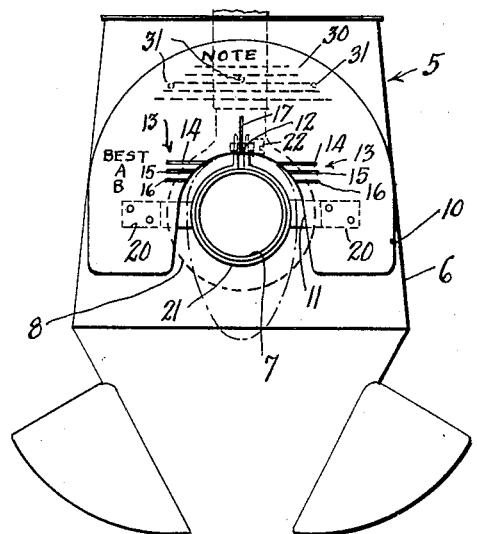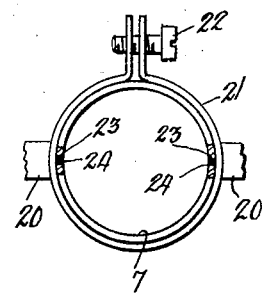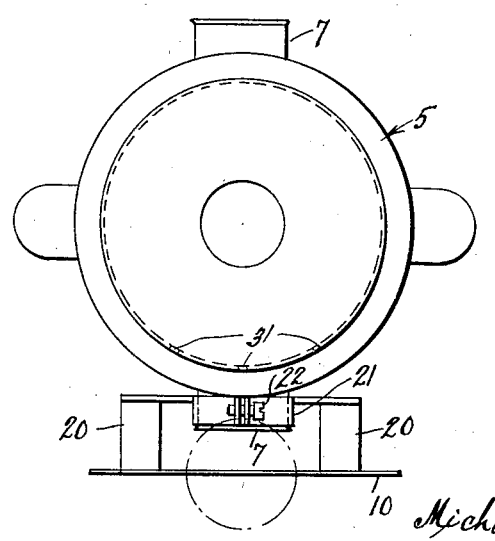

1,740,661

UNITED STATES PATENT OFFICE

MICHAEL MAX MAUER, OF NEW YORK, N. Y.

EGG-CANDLING DEVICE

Application filed February 2, 1929. Serial No. 337,145.

This invention relates to improvements in egg candling devices, and more particularly to the means for accurately determining the size of the air cell in eggs, so as to properly classify the said eggs.

One of the objects of the invention is to provide a gauge for egg candling having a scale of markings thereon by which scale the depth of the air cell in an egg can be accurately determined.

Another object of the invention is to provide a gauge of the character referred to with means for properly locating and securing same to an egg candling lamp.

Another object of the invention is to produce a device of the character described in which the maximum simplicity of construction and operation is secured.

Other objects and advantages will appear as the nature of the improvements is better understood.

In the drawings forming a part of this specification

Figure 1 is a front view in elevation of an egg candling lamp showing one form of my invention as applied thereto.

Figure 2 is a top plan view thereof and

Figure 3 is a detail view of a modified form of the gauge mounting.

Referring to the drawings in detail 5 indicates an egg candling lamp which is of the usual construction and consists of a casing 6 having tubes 7 which concentrate and direct the rays of light emanating from an electric light 8 suspended within the casing. The lamp casing may be adjustably mounted in an upright or standard 6ª.

Up to the present time eggs have been candled by placing an egg against one of the said tubes to determine the air cell in the egg as well as the condition of the yolk and white. This system has proven unsatisfactory as it is a very difficult matter to accurately determine air cell size or depth by the naked eye as a very slight difference in the depth of the said air cell will make a difference in the grade of the egg.

To obviate this difficulty, I have provided a gage plate 10 made of any suitable material preferably transparent having an arcuate cutout portion 11 whose width is sufficiently large enough to accommodate the diameter of the largest size egg. The said cutout is preferably provided with a flat gauging surface 12 against which the air cell containing portion of the egg is placed when it is being candled. On each side of the cutout 11 I have provided a graduated scale 13 which preferably comprise a series of horizontal cuts or narrow slits 14, 15 and 16. These cuts or slits are spaced from the gauging surface 12 according to the U. S. standard of quality for eggs, the distance between the surface 12 and the slit 14 being 1/8 of an inch, the distance from the said surface to slit 14, 1/4 of an inch and the distance to the slit 16, 3/8 of an inch. A vertical center line indicating slit 17 is also provided at the center and at right angles to the surface 12.

To secure the gage plate 10 to the lamp casing 5 and to properly locate same in relation to the light concentrating and directing tubes 7, I affix brackets 20 to the said plate, which brackets 20 are in turn fixed to a clamping ring 21 adapted to fit over the tubes 7, a screw 22 clamps the ring and plate in place on the said tubes. If desired the ring may be provided with projections or pins 23 fitting into openings or grooves 24 in the tubes 7, Fig. 3.

After the device is secured to the candling lamp an egg with its air cell containing end or head is placed against the flat surface 12 of the plate 10, with the vertical center of the said egg in line with the cutout 17. If the air cell depth is not greater than the distance between the top of the egg and the line 14 then it is graded as best, if below the said line, but not below the line 15 it is graded as grade A, and if below the line 15 but not below the line 16 it is graded as grade B. Instructions as to the condition of the white and yolk are printed in an area 30 on the plate 10. For "best" eggs the yolk may be dimly visible, and the white clear and firm, grade A yolk may be visible, the white clear and firm, grade B yolk may be visible and mobile, white reasonably firm. Where the air cell is below the line 16 or even when at or above the said mark, but the conditions of the yolk and white are not in accordance with the instructions on the plate the egg is then classed as grade C or unclassified.

When assembled the plate 10 is spaced far enough from the end of the tube 7 so as to cross approximately at the center of the largest egg. This spacing also permits sufficient light to seep through to the cutouts 14, 15, 16 and 17 so that they may be visible in a candling room which is dark. If the plate is made of transparent material the seepage of light will be sufficient to light up the instruction containing area of the plate. However if desired one or more tiny openings 31 may be pierced in the lamp casing 6 to sufficiently light up the said area without interfering with the candling operation.

From the above it will be seen that I have provided an air cell depth measuring gauge adapted to be secured to the ordinary candling lamp in such a manner that even a novice may be able to determine the grade of eggs when candled.

Many changes could be made in the above construction and many apparently widely different embodiments of this invention could be made without departing from the scope thereof. It is intended that all matters contained herein in the above description or shown in the accompanying drawings shall be interpreted as illustrative and not in a limiting sense. It is also to be understood that the language used in the following claims is merely intended to cover all the generic and specific features of the invention herein described, and that materials, sizes and relativities of parts are non-essential, except as called for in the claims.

Having described my invention what I claim as new and desire to secure by Letters Patent is:

1. In a candling device having a candling lamp provided with a light directing tube, an air cell depth gage plate, means for securing the said gage plate to the said tube, the said means comprising brackets secured to the plate, and a clamping ring on the brackets adapted to fit over the tube.

2. In a device of the nature described having a candling lamp provided with a light directing tube, an air cell depth gage plate having an egg admitting cutout therein, a clamping ring adapted to be secured to the tube and brackets on the said ring secured to the plate to space the plate a sufficient distance from the end of the tube to permit the proper locating of an egg in the said cutout.

3. In a device of the nature described having a candling lamp provided with a light directing tube, an air cell depth gage plate having an egg admitting cutout therein, a clamping ring adapted to be secured to the tube and brackets on the said ring secured to the plate to space the plate a sufficient distance from the end of the tube to permit the proper locating of an egg in the said cutout, and means on the ring and tube for locating the said plate in a predetermined position on the lamp.

4. In a device of the nature described having a candling lamp provided with a light directing tube, an air cell depth gage plate having an egg admitting cut out therein, an egg head locating surface in the cutout, a scale on the said gage plate comprising slits spaced at predetermined distances from the said surface, and means secured to the gage plate for spacing same from the end of the tube and securing it thereto, so as to permit some of the light from the tube to light up the said slits from the rear of the plate.

In testimony whereof I hereunto affix my signature.

MICHAEL M. MAUER.